United States Patent [19]

Morris et al.

[11] Patent Number: 4,535,268

[45] Date of Patent: Aug. 13, 1985

[54] HIGH PRESSURE TIPLESS TUNGSTEN HALOGEN LAMP

[75] Inventors: Merle E. Morris, Lexington; Steven L. Meade, Winchester; Lawrence M. Rice, Lexington, all of Ky.

[73] Assignee: GTE Products Corporation, Danvers, Mass.

[21] Appl. No.: 480,530

[22] Filed: Mar. 30, 1983

[51] Int. Cl.³ .................. H01K 1/28; H01K 1/50; H01K 3/22; H01K 3/26

[52] U.S. Cl. .................. 313/569; 313/579; 313/634; 445/16; 445/27

[58] Field of Search ............ 313/579, 569, 634; 445/16, 27

[56] References Cited

U.S. PATENT DOCUMENTS

| | | |
|---|---|---|
| 2,870,586 | 1/1959 | Pearson et al. |
| 2,900,771 | 8/1959 | Levand. |
| 3,162,499 | 12/1964 | Gustin. |
| 3,211,511 | 10/1965 | Levand, Jr. ............ 445/27 |
| 3,279,877 | 10/1966 | Smith et al. |
| 3,551,722 | 12/1970 | Holcomb et al. ........ 313/579 |
| 3,589,790 | 6/1971 | Beane et al. |
| 3,719,853 | 3/1973 | Sugano et al. ......... 313/579 |
| 3,843,899 | 10/1974 | T'Jampens et al. ..... 313/579 |
| 3,956,659 | 5/1976 | Almer et al. .......... 313/579 |
| 4,329,166 | 5/1982 | Murphy ............... 65/270 |

Primary Examiner—Palmer Demeo
Attorney, Agent, or Firm—Lawrence R. Fraley

[57] ABSTRACT

A high pressure, tungsten halogen lamp wherein a predetermined quantity of a gas mixture including an inert gas (e.g., argon) and halogen compound (e.g., methyliodide) constitute the lamp's combined atmosphere. The gas mixture is flowed into the tubular member which ultimately comprises the lamp's envelope and is then cooled sufficiently to form either a pool of liquified gas or, alternatively, a frozen, solidified member. A quantity of nitrogen gas established at a predetermined atmospheric pressure is also flowed into the tubular member while a press sealing operation is accomplished to seal the member. When the lamp is then subjected to normal room temperature, the pool (or solidified member) becomes gasified to produce the elevated internal pressure, which may readily approach three atmospheres.

24 Claims, 5 Drawing Figures

U.S. Patent  Aug. 13, 1985  4,535,268
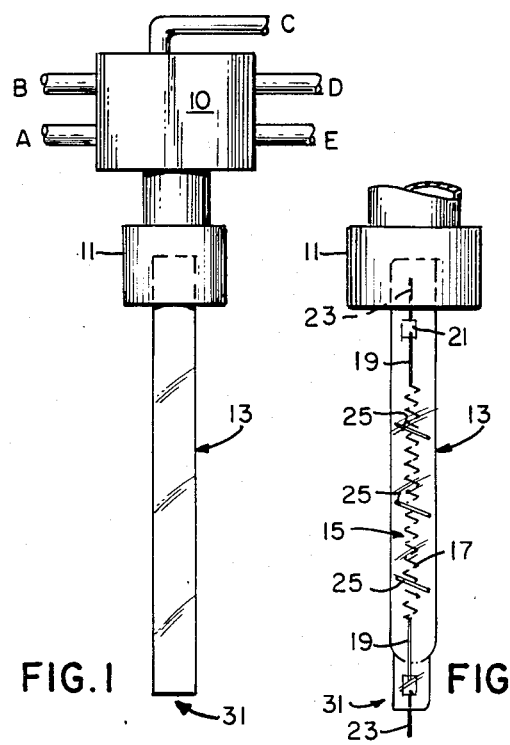
FIG. 1
FIG. 2
FIG. 3
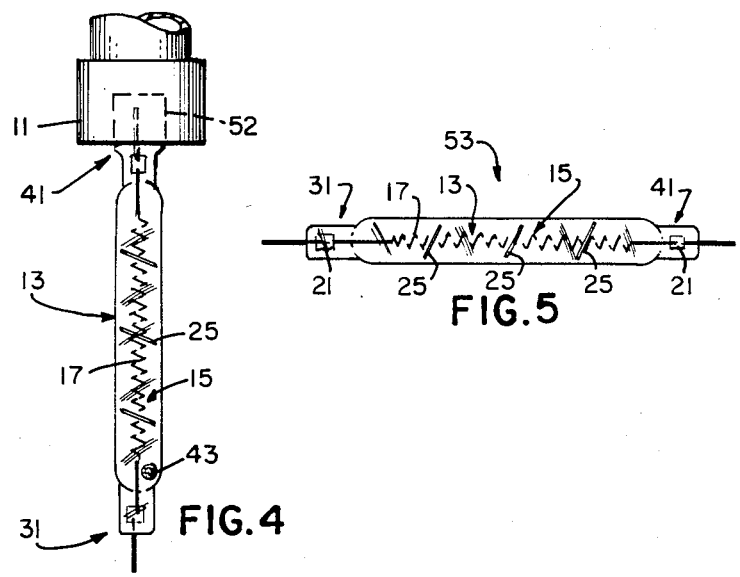
FIG. 4
FIG. 5

HIGH PRESSURE TIPLESS TUNGSTEN HALOGEN LAMP

TECHNICAL FIELD

The invention relates to incandescent lamps and particularly to incandescent lamps having envelopes of a generally tubular configuration. Even more particularly, the invention relates to such lamps wherein the finished envelope contains an inert gas and halogen therein at high pressure.

BACKGROUND

In most tubular incandescent lamps of the variety described above, it is typically necessary to seal a longitudinally supported tungsten filament within both ends of the lamp's envelope and fill the lamp with an inert gas and halogen. The function of the inert gas is to retard the vaporization of the tungsten filament during illumination thereof. The halogen is added to prolong the tungsten filament life by slowing the rate of evaporation thereof. The halogen cycle is well known, and its utilization in many lamps in today's art is well documented.

One method commonly used to produce lamps of the type described above was to press seal the supported filament structure within one end of the envelope while the other end was temporarily plugged. An inert gas was flowed into the envelope through a centrally appended exhaust tube. While flowing the inert gas through the exhaust tube, the plug was removed and the opposing open end of the envelope then press sealed, following which the exhaust tube was tipped to thus seal the envelope. Providing an atmosphere of inert gas within the envelope during sealing operations was deemed essential to prevent oxidation of the highly heated filamentary components. In order to produce lamps of the high pressure type (those wherein the final internal pressure exceeds one atmosphere, e.g., three atmospheres), it was considered necessary to immerse one end of the envelope within a coolant to lower the volume of the gas before sealing of the envelope at the tubulation. Cooling was considered necessary in order that the relatively high internal pressure would not blow out the "tip" when the sealing torches were applied to accomplish tipping.

While the above described method was utilized to produce high pressure tungsten halogen lamps, a fused tip, usually centrally located, always remained on the envelope, and in many applications was deemed quite undesirable because of it's possible adverse effects on the optical properties of the lamp. For example, when a tubular lamp having a residual fused tip was used in a photocopy machine, it was found that the light was sometimes unevenly distributed upon the paper and, since exact and critical limitations are placed upon the distribution of light in such machines, the work was not perfectly copied. In addition, the presence of a residual tip provided physical limitations in such areas as lamp packing and subsequent placement within the apparatus (e.g., photocopy machine) utilizing the lamp.

It is believed, therefore, that a high pressure tungsten halogen lamp wherein the lamp's envelope does not contain a residual, protruding tip member thereon and which thus eliminates many of the associated disadvantages of lamps such as stated above would constitute an advancement in the art.

DISCLOSURE OF THE INVENTION

It is, therefore, a primary object of the instant invention to provide a high pressure, tungsten halogen lamp wherein the need for a residual tip is eliminated.

It is again understood with regard to this invention that by the term high pressure is meant a tungsten halogen lamp wherein the finished envelope thereof contains a combined atmosphere of an inert gas and halogen compound established at a pressure exceeding one atmosphere. Most particularly, lamps according to the instant invention may possess an internal pressure of about three atmospheres.

In accordance with one aspect of the invention, there is provided an improved tungsten halogen lamp including an envelope with regular and smooth outer surfaces and opposed, sealed end portions. A coiled tungsten filament is located within the envelope. The improvement comprises a combined atmosphere within the envelope and established at high pressure, the atmosphere including a gas mixture and nitrogen. The gas mixture, comprised of an inert gas and a halogen compound, is formed by gasification of a pool of liquified gas which was sealed within the envelope during final sealing thereof. The nitrogen is present as a result of being flowed within an open end of the envelope immediately before sealing the open end In another aspect, a lamp similar to that above is provided except that the gas mixture is formed by gasification of a frozen, solidified member which was sealed within the envelope during final sealing thereof.

BRIEF DESCRIPTION OF THE DRAWINGS

FIGS. 1–4 represent the various steps of producing a high pressure, tungsten halogen lamp in accordance with one embodiment of the instant invention; and FIG. 5 illustrates a high pressure, tungsten halogen lamp in accordance with a preferred embodiment of the invention.

BEST MODE FOR CARRYING OUT THE INVENTION

For a better understanding of the present invention, together with other and further objects, advantages, and capabilities thereof, reference is made to the following disclosure and appended claims in connection with the above-described drawings.

With particular attention to FIGS. 1–4, there are illustrated the various steps of producing a high pressure, tungsten halogen lamp in accordance with a preferred embodiment of this invention. In FIG. 1, there is shown the distribution head 10 of a press sealing machine (not shown) designed for performing the steps of the instant invention. Head 10 includes a plurality of lines A, B, C, D and E designed to provide the various vacuum, flushing and gas feeding operations to be described in greater detail below. Forming part of head 10 is a connector 11 designed for holding therein one end of a tubular member 13 of vitreous material which is to eventually constitute the sealed envelope of the lamp produced in accordance with the teachings herein. The preferred vitreous material for tubular member 13 is glass possessing a high silica content. Examples include quartz or vycor. Another suitable material is hardglass (e.g., borosilicate).

As shown in FIG. 1, tubular member 13 is vertically oriented such that one of its two opposed open ends is retained within connector 11. To provide a positive seal, it is preferred that connector 11 include an "0" ring (not shown). It is also seen in FIG. 1 that tubular member 13 includes substantially regular and smooth outer surfaces along the entirety of its cylindrical configuration.

With particular regard to the aforementioned lines A–E, these are designed to function as follows. Line A provides head 10 with a predetermined quantity of an inert gas, preferred examples being argon or krypton. By a predetermined quantity of this gas is meant that a chamber (not shown) is provided within line A of sufficient volume and established at a predetermined pressure to supply the quantity required. Line B is connected to a suitable pump or the like and designed for drawing a vacuum. Line C provides head 10 with a forming gas, primarily used for flushing during the operation described herein. Line D, like line A, is connected to a premeasured volume chamber in order that a predetermined quantity of a halogen compound can be supplied. Examples of halogen compounds for use in the instant invention include methyliodide, methylbromide, dimethylbromide, and hydrogenbromide. Lastly, line E provides nitrogen gas at an established pressure to head 10 and, therefore, to the tubular member 13 retained thereby.

An initial step in making the lamp of the instant invention involves the formation of a filament sub-assembly 15 (FIG. 2). Sub-assembly 15, which may be frictionally positioned within tubular member 13 prior to positioning of the tubular member 13 within connector 11, includes a coiled tungsten filament 17, a pair of opposed inner lead-in wires 19 connected to opposite ends of filament 17, a pair of thin molybdenum foil members 21, each connected (e.g., welded) to one end of the respective inner lead-in wires 19, and a pair of outer lead-in wires 23, each connected (e.g., welded) to an opposing end of the molybdenum foil 21 from the inner lead-in wires 19. Each of the lead-in wires 19 and 23 may be comprised of any of the known metals and alloys presently used in the art. Thus, it is seen that inner lead-in wires 19 serve to electrically interconnect the outer lead-in wires 23 (and foils 21) to filament 17.

Sub-assembly 15, as stated, may be frictionally inserted within tubular member 13 prior to positioning thereof within connector 11. The sub-assembly 15 may also include a plurality of tungsten spacers 25 positioned along and attached to the coiled tungsten filament 17. Spacers 24 are designed to prevent filament sagging when the elongated filament is retained in the envelope formed from tubular member 13. In some instances where, for example, it is desired that the coiled filament 17 be short or where non-sag wire is utilized as the filament, such spacers may be eliminated. Spacers 25 are preferably of either a coiled or disk-like configuration, and, as illustrated, maintain filament 17 at a desired distance from the internal walls of the finished envelope.

With sub-assembly 15 positioned within the open-ended tubular member 13, forming gas is turned on and flushed through the tubular member. Specifically, a valve in line C is activated and forming gas passes therethrough and into and through tubular member 13. The preferred forming gas for accomplishing this flushing operation is a nitrogen-hydrogen mixture wherein the nitrogen to hydrogen ratio is about 90:10. The coiled filament 17 is now energized to reduce any oxides and thus cleanse the filament. Any foreign residue from the filament is flushed out through tubular member 13 using the forming gas. Subsequently, the coiled filament 17 is turned off, line C is turned off, and an inert gas flush is provided. A preferred, inert flushing gas is argon.

In FIG. 2, the first open end 31 (FIG. 1) of tubular member 13 is press sealed using a press sealing operation known in the art. In summary, first end 31 is sealed such that the molybdenum foil 21 and corresponding end portions of lead-in wires 19 and 23 are encapsulated within the now sealed end. Accordingly, the opposing, non-sealed ends of wires 19 and 23 project within tubular member 13 and externally from the sealed end thereof, respectively.

The aforedefined press sealing of end 31 is accomplished, as stated, using a press sealing operation known in the art. In brief summary, the end is heated by press seal fires to raise the temperature of the vitreous material sufficient to enable the press "feet" to close and engage the first end to the depth required, thus providing encapsulation of the components as shown.

With the first end 31 of tubular member 13 now positively sealed, the tubular member is pumped out using a vacuum drawn through line B of head 10. Subsequent to the vacuum formation, flushing of tubular member 13 is achieved by use of the aforementioned forming gas. This vacuum and flushing procedure is repeated three times, with a leak checker (not shown) monitoring the vacuum during each pump down. Pump down pressure is preferably about 10 microns.

Subsequently, liquid nitrogen 35 is sprayed onto outer surfaces of the tubular member 13 using sprayers 37 located toward the lower portion of the tubular member (FIG. 3). Although two such sprayers 37 are illustrated, it is only necessary in the instant invention to provide one of these members to provide sufficient contact with the outer surfaces of tubular member 13. With tubular member 13 adequately cooled, valves (not shown) located within lines A and D are activated to enable flowing of a predetermined quantity of a gas mixture of the aforedefined inert gas and halogen compound within tubular member 13 through the second, opposed open end (41) retained within connector 11. In one example, a premeasured chamber which supplied line D possessed an internal volume of about 3 to 5 cubic centimeters and was pressurized to approximately 50 mm to 100 mm. Accordingly, the inert gas was supplied from a premeasured chamber of approximately 10 cubic centimeter volume pressurized at 1,500 mm to 3,000 mm. Understandably, the invention thus provides a means whereby an exact, predetermined quantity of a gas mixture of the desired inert gas and halogen compound may be flowed into the retained tubular member. In this mixture, it is preferred that the halogen compound comprise from about 0.15 to about 1.80 percent of the total combined mixture.

The gas mixture now located within tubular member 13, which in turn has been significantly cooled as a result of contact by liquid nitrogen 35, is cooled to the extent that a frozen, solidified member 43 is formed within the bottom (above the sealed end) of tubular member 13. Member 43 is, in effect, a singular ice ball of substantially spherical configuration which rests in the bottom of tubular member 13. In an alternate embodiment, it was only necessary to simply cool and not freeze the contained gas mixture sufficient to form a pool (not shown) of liquified gas within the bottom of tubular member 13. In this latter embodiment, it is understood that the gas mixture is not frozen but is instead only cooled to attain the aforedefined liquid state. In summary, the invention can be satisfactorily performed through either formation of a pool of liquified gas or the illustrated frozen, solidified member 43.

In either of these conditions, the tubular member 13 is now actually under a vacuum as a result of the reduction in pressures of the inert gas and halogen.

A burner 51 is now activated to impinge a flame onto the upper portion of tubular member 13 as shown in FIG. 3. With this occurring, a valve (not shown) in line E is activated to flow a quantity of nitrogen gas established at a predetermined atmospheric pressure into the second open end 41 of tubular member 13. Because the pool of liquified gas or frozen, solidified member 43 are of exact quantities so as to eventually produce two atmospheres of pressure within the sealed tubular member 13, and because it is desired in the instant invention to produce a lamp possessing an overall internal pressure of three atmospheres, the described nitrogen gas is established at one atmosphere of pressure and maintained at said pressure during this flowing cycle.

With the vitreous material at the upper end portion of tubular member 13 now raised to an adequate pressing temperature by burner 51 and with the described nitrogen gas still flowing, a press seal is formed within the second opposing end 41 of tubular member 13. As shown in FIG. 4, this pressing operation encapsulates the molybdenum foil 21 and adjoining ends of the respective lead-in wires 19 and 23 in much the same manner as the sealing operation of opposing end 31. Thus, it is understood that this press sealing of the second end 41 is accomplished while tubular member 13 is still retained within connector 11. Subsequent to this forming operation, the unwanted, retained portion 52 of tubular member 13 is removed, and a finished lamp 53 results therefrom. Lamp 53 includes all of the aforementioned elements (e.g., coiled filament 17, molybdenum foils 21, spacers 25, etc.) and, when subjected to normal room temperature (70° Farenheit), enables the contained solidified frozen member 43 or pool of liquified gas to gasify (form a gas) which, as defined, is at about two atmospheres. The end result is a lamp 53 possessing a sealed envelope structure having an overall internal pressure of three atmospheres. The contained gas mixture within this envelope structure is, as defined, a combined atmosphere of an inert gas and halogen compound, as well as nitrogen.

It is understood that various modifications to the above method can be performed. For example, although it has been stated that it is preferred to flow nitrogen at the described pressure into the second open end of tubular member 13 during the press sealing of the second open end thereof, it is possible to terminate this supply of gas immediately prior to the sealing operation and still maintain the desired additional one atmosphere within the tubular member. In addition, it is possible to turn off burner 51 immediately prior to effecting the described press seal of the second open end. Still further, a quantity of halogen gas was also flowed into tubular member 13 along with the described nitrogen gas, the atmospheric pressure of both combined quantities being established at the desired one atmosphere.

Although it has been shown to utilize a head 10 wherein five lines are provided, it is also within the scope of the invention to combine two of these lines (A and D), into one and thus provide a singular, premeasured chamber of both for subsequent, simultaneous injection into the tubular member. In other words, the inert gas and halogen compound could be premixed in a singular chamber of specified volume and introduced into head 10. About the only disadvantage of this latter arrangement is the loss of versatility in that it prevents ready pre-mixing of gases to, in turn, require that this chamber be changed when a different lamp type having a different inert gas/halogen ratio is desired.

As stated above, the nitrogen gas is utilized to maintain one atmosphere of pressure within the tubular member while the second press seal is accomplished. Because nitrogen does not "freeze out" as readily as do the inert gases utilized, it is readily possible to control the freeze times, heating fires, and nitrogen gas supply times to hold the amount of nitrogen in the finished lamp structure to the desired (one) atmosphere. If during the second press sealing operation, equal internal and external pressures were not maintained, the softened vitreous material (e.g., quartz) would be distorted immediately prior to effecting the second seal. Specifically, if there exists a partial vacuum within the tubular member during this time period, the softened vitreous material will be drawn inwardly whereas if the pressure within the tubular member is greater than one atmosphere (the external pressure) during this period, the softened vitreous material will expand (flow) outwardly.

Thus, there has been shown and described a high pressure tungsten halogen lamp wherein it is possible to precisely establish the final internal pressure of the lamp during the formation thereof. In one example, an established gas mixture is cooled sufficiently to form a pool of liquified gas within the tubular member which eventually comprises the envelope in the finished lamp. In another example, this gas mixture is frozen to the extent that it forms a solidified member within the tubular member. Because exact quantities of gas mixture are introduced into the tubular member during this cooling, it is possible to exactly determine the resulting pressure generated thereby when the finished lamp is subsequently exposed to normal room temperatures. Finished lamps possessing a total internal volume of about three atmospheres are readily possible. Still further, lamps of the instant invention do not possess a highly undesirable residual tip as did many such lamps of the prior art.

While there have been shown and described what are present to be considered the preferred embodiments of the invention, it will be obvious to those skilled in the art that various changes and modification may be made therein without departing from the scope of the invention as defined by the appended claims.

What is claimed is:

1. In a tungsten halogen lamp including a tubular envelope of vitreous material containing a combined atmosphere therein and having substantially regular and smooth outer surfaces and first and second, opposed sealed end portions, and a coiled tungsten filament located within said envelope, the improvement wherein said combined atmosphere is established at high pressure greater than one atmosphere and comprises a gas misture and nitrogen, said gas mixture including an inert gas and a halogen compound formed by gasification of a pool of liquified gas sealed within said envelope, said nitrogen being present within said envelope at a pressure of one atmosphere by flowing said nitrogen established at a pressure of one atmosphere into an open end of said envelope immediately prior to sealing thereof, said tubular envelope not including a protruding, residual tip or the like thereon.

2. The improvement according to claim 1 wherein said pool of liquified gas is formed within said envelope by flowing a predetermined quantity of said inert gas and halogen compound into said open end of said envelope prior to sealing thereof and cooling said predetermined quantity while in said envelope.

3. The improvement according to claim 2 wherein said inert gas is selected from the group consisting of argon and krypton.

4. The improvement according to claim 3 wherein said halogen compound is selected from the group consisting of methyliodide, methylbromide, dimethylbromide, and hydrogenbromide.

5. The improvement according to claim 4 wherein said halogen compound comprises from about 0.15 to about 1.80 percent of said gas mixture.

6. The improvement according to claim 2 wherein said predetermined quantity of said inert gas and said halogen compound flowed into said envelope prior to sealing thereof forms a pool of said liquified gas within said envelope sufficient in size to raise the internal pressure within said envelope about two atmospheres as a result of said gasification.

7. The improvement according to claim 6 wherein said gasification is accomplished by subjecting said sealed envelope having said pool of liquified gas therein to room temperature for an established time period.

8. The improvement according to claim 6 wherein said combined atmosphere contained within said envelope after said sealing thereof and said gasification of said pool of said liquified gas is about three atmospheres.

9. The improvement according to claim 1 wherein said vitreous material of said tubular envelope is selected from the group consisting of quartz and hard-glass.

10. The improvement according to claim 1 further including first and second outer lead-in wires sealed within and projecting from said first and second, opposed sealed end portions of said envelope, respectively, said outer lead-in wires electrically connected to said coiled tungsten filament at opposing ends thereof.

11. The improvement according to claim 10 further including first and second inner lead-in wires sealed within said first and second, opposed sealed end portions of said envelope, respectively, each of said inner lead-in wires electrically interconnecting a respective one of said outer lead-in wires and said coiled tungsten filament.

12. The improvement according to claim 11 further including a plurality of spacers connected to said coiled tungsten filament at spaced locations therealong, said spacers positioning said filament within said envelope at a spaced location from the internal walls of said envelope.

13. In a tungsten halogen lamp including a tubular envelope of vitreous material containing a combined atmosphere therein and having substantially regular and smooth outer surfaces and first and second, opposed sealed end portions, and a coiled tungsten filament located within said envelope, the improvement wherein said combined atmosphere is established at high pressure greater than one atmosphere and comprises a gas mixture and nitrogen, said gas mixture including an inert gas and a halogen compound formed by gasification of a frozen, solidified member sealed within said envelope, said nitrogen being present within said envelope at a pressure of one atmosphere by flowing said nitrogen established at a pressure of one atmosphere into an open end of said envelope immediately prior to sealing thereof, said lamp envelope not including a protruding, residual tip or the like thereon.

14. The improvement according to claim 13 wherein said frozen, solidified member is formed within said envelope by flowing a predetermined quantity of said inert gas and halogen compound into said open end of said envelope prior to sealing thereof and freezing said predetermined quantity while in said envelope.

15. The improvement according to claim 14 wherein said inert gas is selected from the group consisting of argon and krypton.

16. The improvement according to claim 15 wherein said halogen compound is selected from the group consisting of mehtyliodide, methylbromide, dimethylbromide, and hydrogenbromide.

17. The improvement according to claim 16 wherein said halogen compound comprises from about 0.15 to about 1.80 percent of said gas mixture.

18. The improvement according to claim 14 wherein said predetermined quantity of said inert gas and said halogen compound flowed into said envelope prior to sealing thereof forms a frozen, solidified member within said envelope sufficient in size to raise the internal pressure within said envelope about two atmospheres as a result of said gasification.

19. The improvement according to claim 18 wherein said gasification is accomplished by subjecting said sealed envelope having said frozen, solidified member therein to room temperature for an established time period.

20. The improvement according to claim 18 wherein said combined atmosphere contained within said envelope after said sealing thereof and said gasification of said frozen, solidified member is about three atmospheres.

21. The improvement according to claim 13 wherein said vitreous material of said tubular envelope is selected from the group consisting of quartz and hard-glass.

22. The improvement according to claim 13 further including first and second outer lead-in wires sealed within and projecting from said first and second, opposed sealed end portions of said envelope, respectively, said outer lead-in wires electrically connected to said coiled tungsten filament at opposing ends thereof.

23. The improvement according to claim 22 further including first and second inner lead-in wires sealed within said first and second, opposed sealed end portions of said envelope, respectively, each of said inner lead-in wires electrically interconnecting a respective one of said outer lead-in wires and said coiled tungsten filament.

24. The improvement according to claim 23 further including a plurality of spacers connected to said coiled tungsten filament at spaced locations therealong, said spacers positioning said filament within said envelope at a spaced location from the internal walls of said envelope.

* * * * *